March 8, 1960    W. C. STERN    2,927,333
ASSEMBLING MACHINE
Filed Oct. 3, 1956    9 Sheets-Sheet 1

INVENTOR.
William C. Stern
BY
Olson & Trexler
attys.

March 8, 1960 W. C. STERN 2,927,333
ASSEMBLING MACHINE
Filed Oct. 3, 1956 9 Sheets-Sheet 2

INVENTOR.
William C. Stern
BY:
Olson & Trexler
attys.

March 8, 1960 W. C. STERN 2,927,333
ASSEMBLING MACHINE
Filed Oct. 3, 1956 9 Sheets-Sheet 3
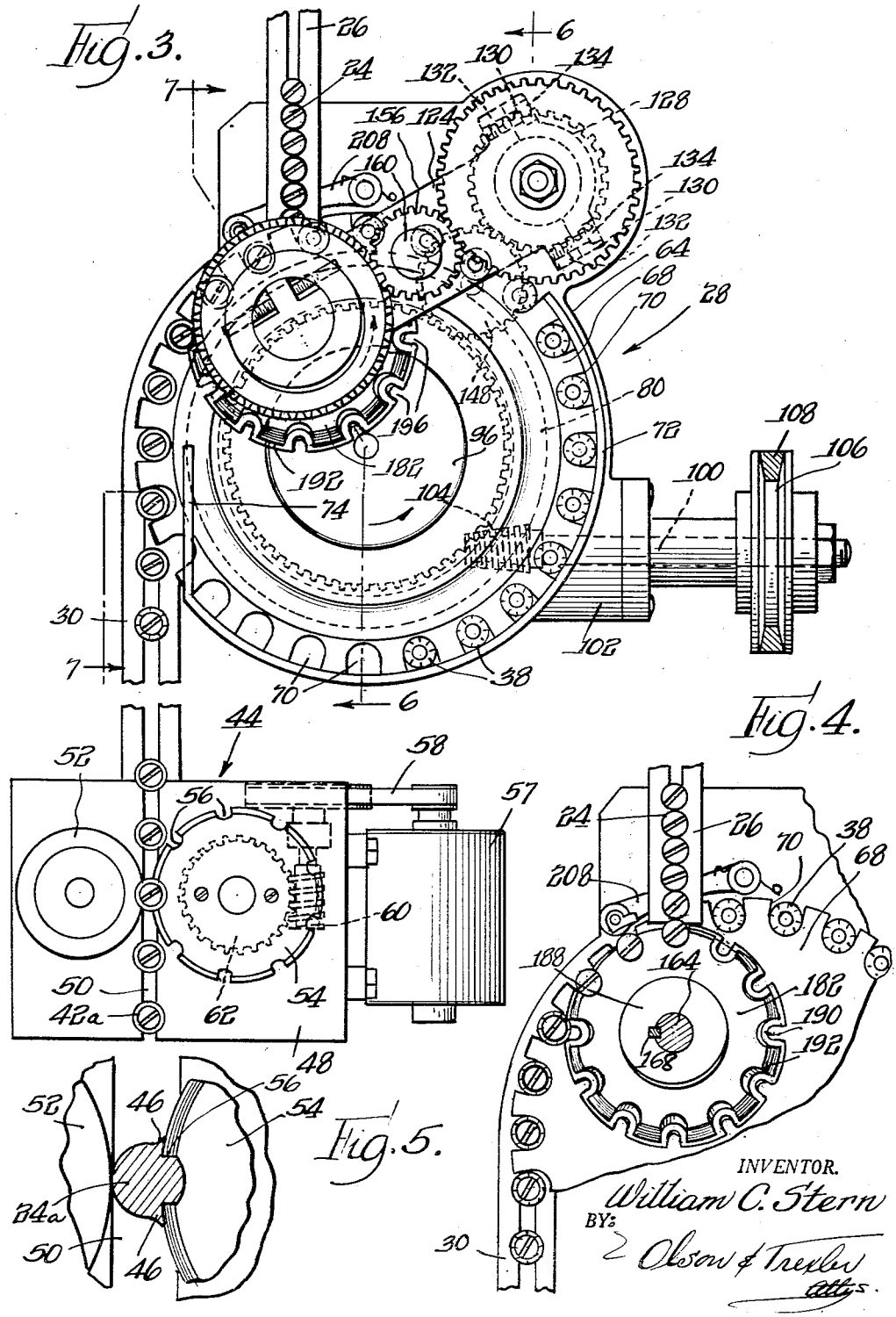
INVENTOR.
William C. Stern
BY
Olson & Trexler
Attys.

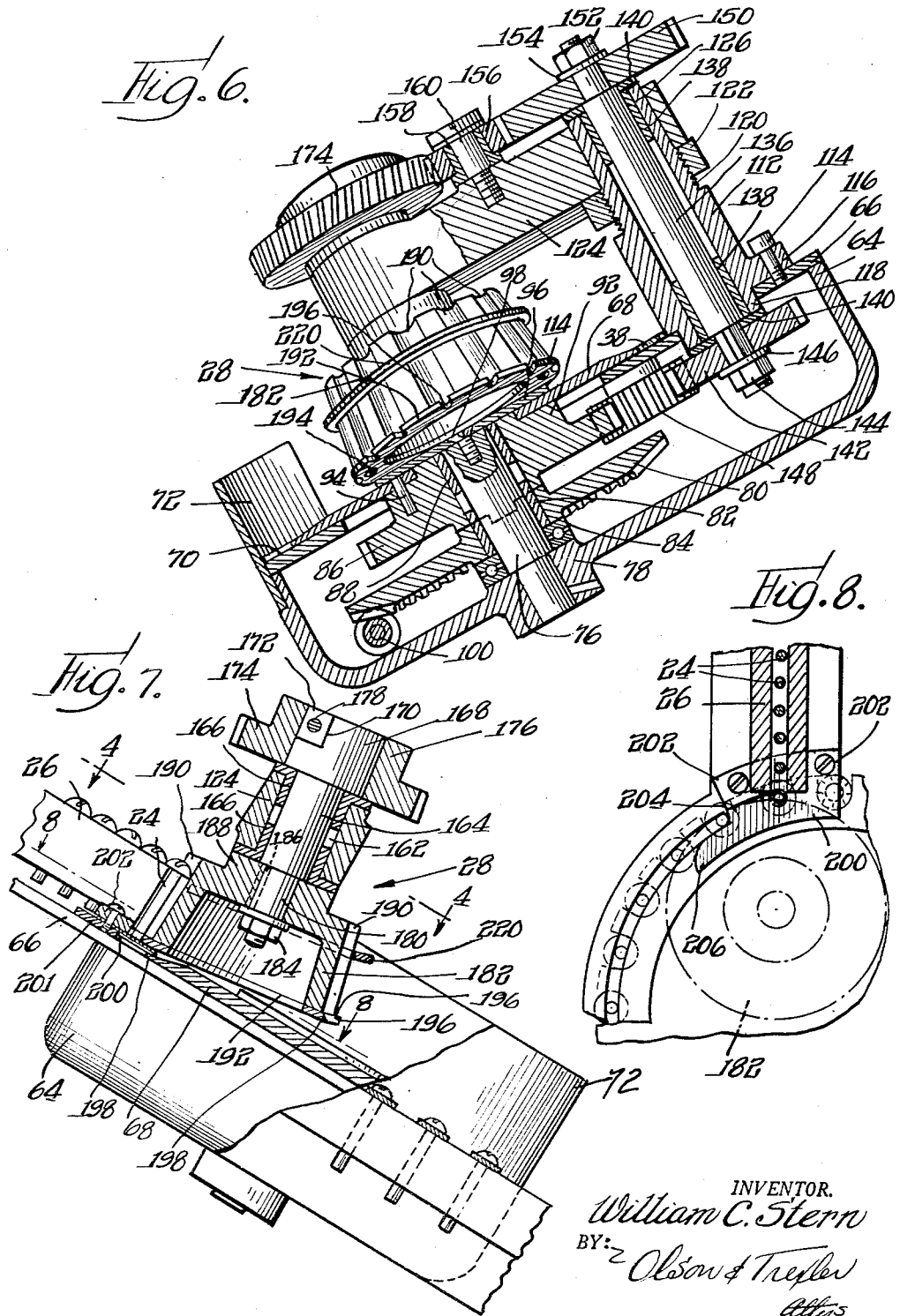

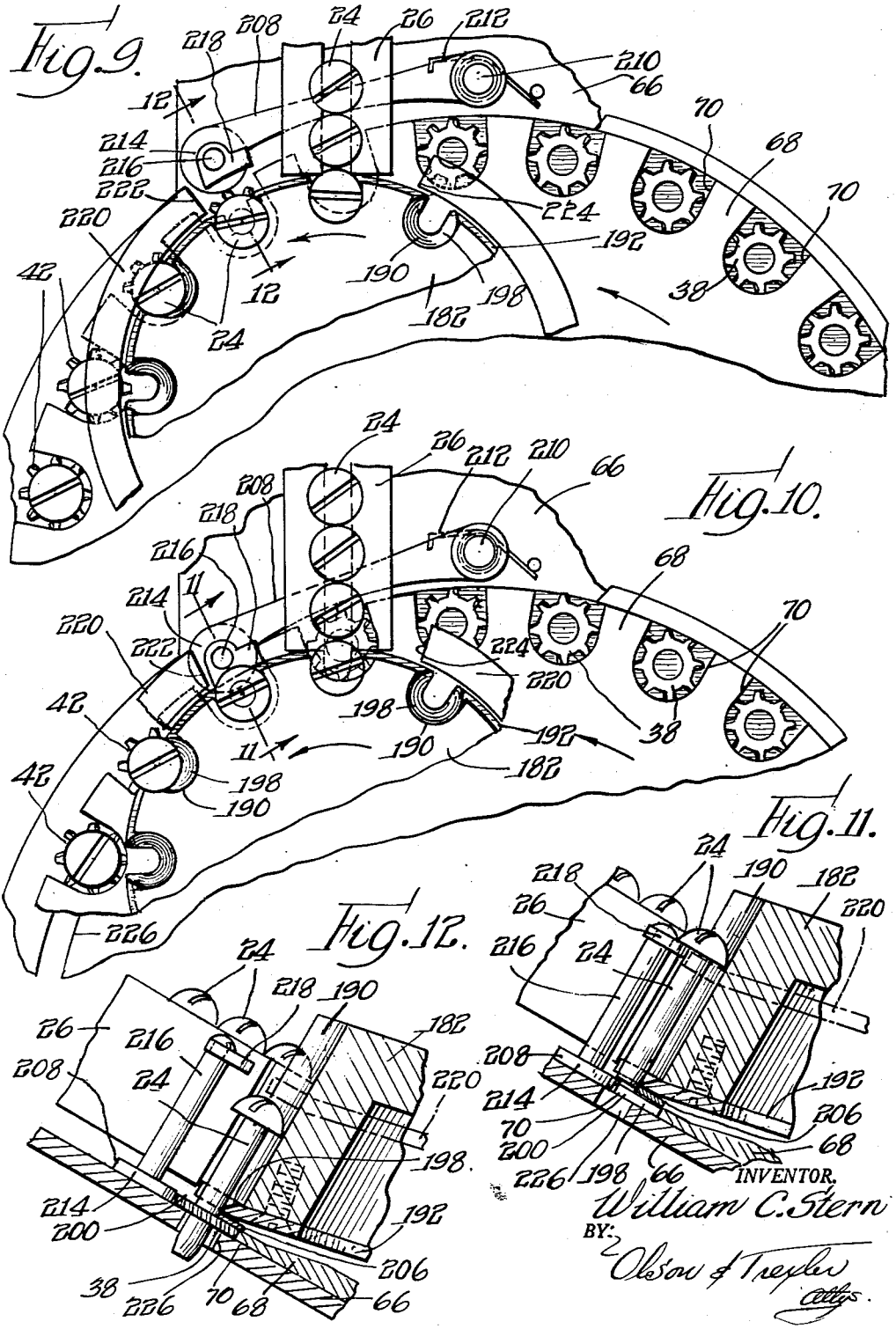

March 8, 1960
W. C. STERN
2,927,333
ASSEMBLING MACHINE
Filed Oct. 3, 1956
9 Sheets-Sheet 6
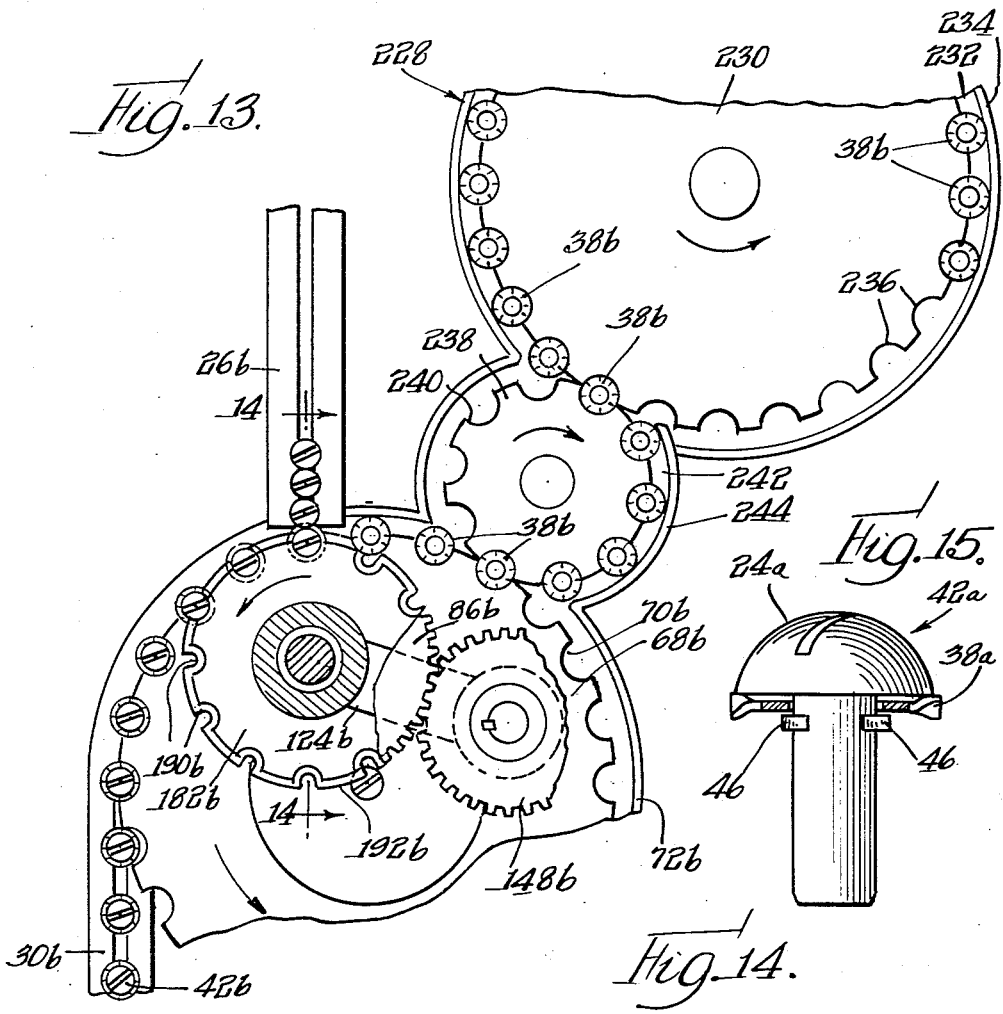
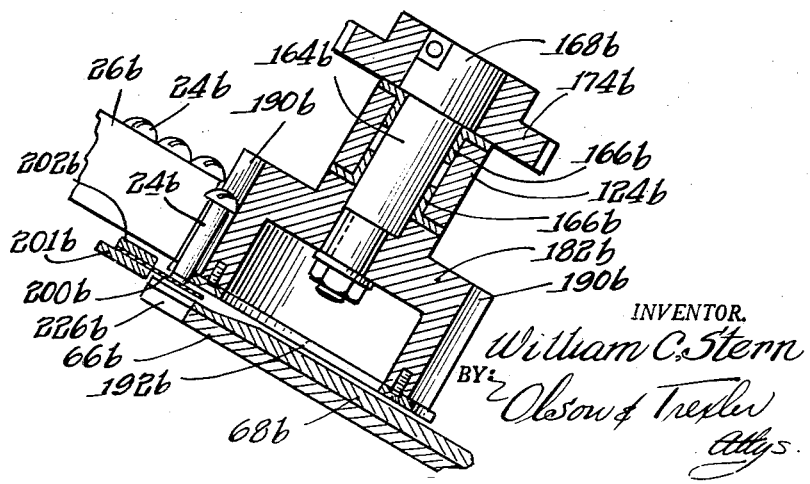
INVENTOR.
William C. Stern
BY Olson & Trexler
Attys.

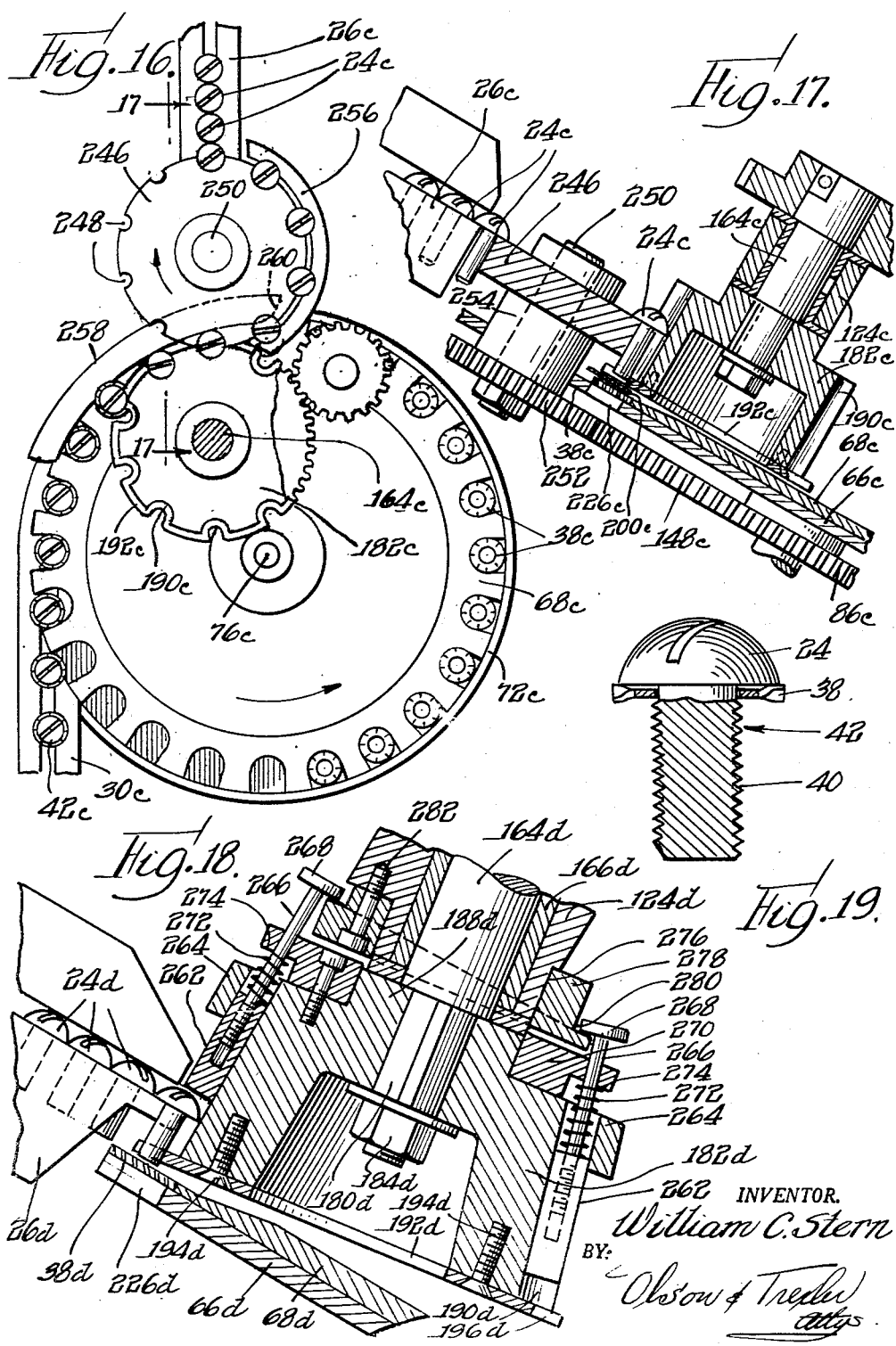

March 8, 1960 W. C. STERN 2,927,333
ASSEMBLING MACHINE
Filed Oct. 3, 1956 9 Sheets-Sheet 8

INVENTOR.
William C. Stern
BY Olson & Trexler
attys.

March 8, 1960  W. C. STERN  2,927,333
ASSEMBLING MACHINE
Filed Oct. 3, 1956
9 Sheets-Sheet 9
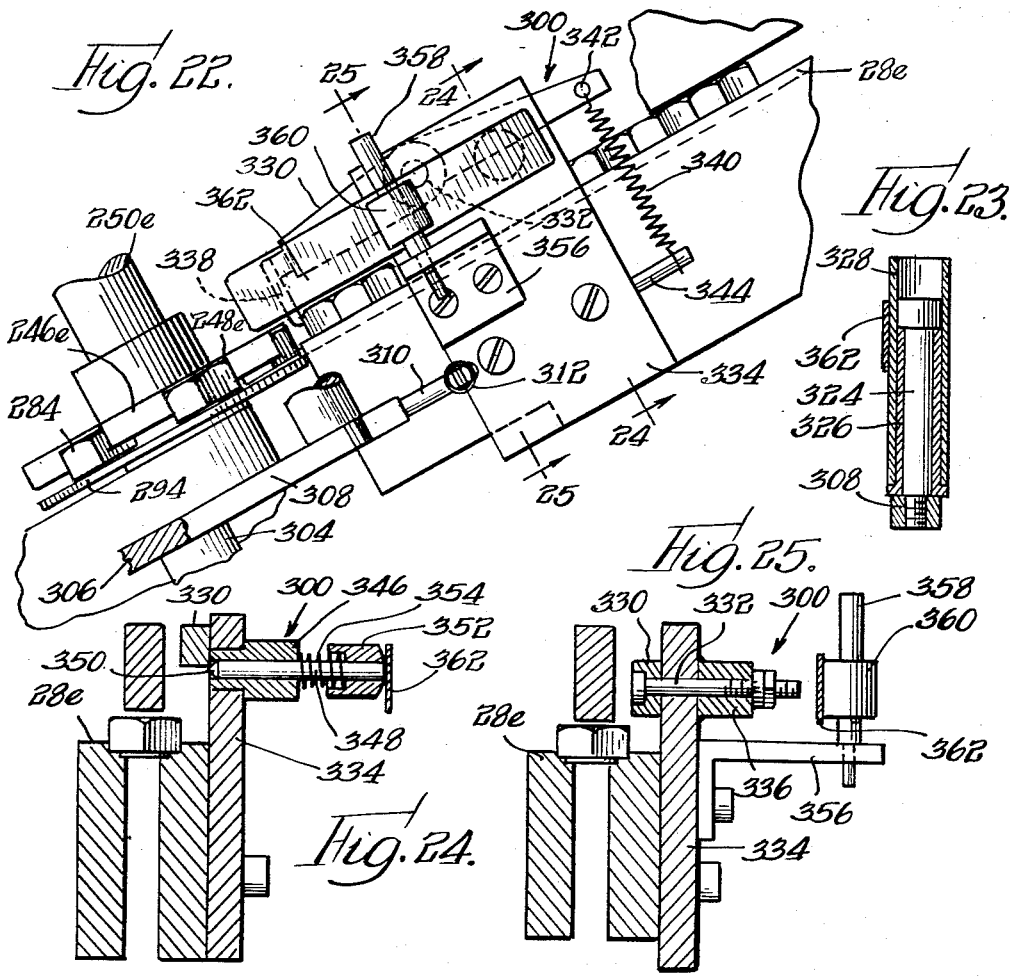
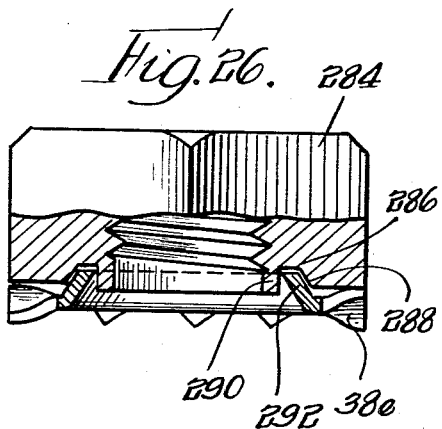
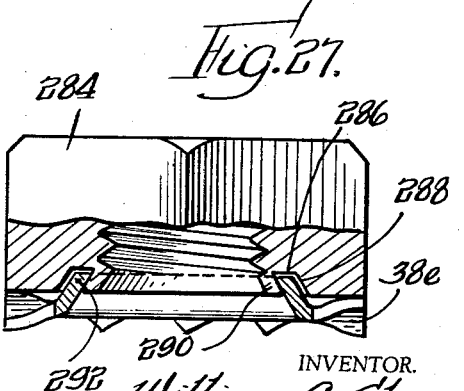
INVENTOR.
William C. Stern
BY Olson & Trexler
Attys.

ing a further modified form of the invention;

United States Patent Office 2,927,333
Patented Mar. 8, 1960

2,927,333

ASSEMBLING MACHINE

William C. Stern, Park Ridge, Ill., assignor to Illinois Tool Works, Chicago, Ill., a corporation of Illinois Application October 3, 1956, Serial No. 613,633

20 Claims. (Cl. 10—155)

This invention is concerned generally with a machine for producing preassembled fastener units consisting of a threaded fastener and a washer, and more specifically with a machine having improved apparatus or devices for telescopically assembling fasteners and washers.

Machines are known in the art for assembling fasteners, such as screw blanks, with washers whereby a deforming operation, such as thread rolling, permanently traps the washer on the fastener. Many such machines have been intermittent motion machines. The speed of assembly accordingly is limited. Other machines have been proposed wherein the washers are moved continuously, by means such as a disk having recesses receiving the washers. The screw blanks or other fasteners then are inserted in the washers while the washers are moving. This has introduced problems of bringing the fasteners up to the speed of the washers and in proper synchronism therewith, and such problems have not been completely solved in the past.

It is an object of this invention to provide a fastener and washer assembling means wherein the fasteners and washers are positively driven at the same rate of speed and in proper synchronism during assembling.

It is a further object of this invention to provide an assembling machine having a pair of overlying disks or other rotary feed devices which are operated in synchronism and which are tangent and coincident at the area of telescoping of the fasteners and washers.

In general, it is an object of this invention to provide an improved machine for assembling fasteners and washers at an extremely high rate of speed.

Other and further objects and advantages of this invention will be understood from the ensuing description when taken in connection with the accompanying drawings wherein:

Fig. 3 is a plan view of the assembling portion of the apparatus with a different type of deforming device;

Fig. 4 is a more or less horizontal view partially in section as taken substantially along the line 4—4 in Fig. 7;

Fig. 5 is a fragmentary plan view on an enlarged scale showing the operation of the deforming device;

Fig. 6 is a vertical sectional view generally taken along the line 6—6 of Fig. 3;

Fig. 7 is another vertical sectional view taken generally along the line 7—7 in Fig. 3;

Fig. 8 is a generally horizontal view partially in section as taken along the line 8—8 in Fig. 7;

Fig. 9 is an enlarged detail view similar to a portion of Fig. 4;

Fig. 10 is a view similar to Fig. 9 showing the parts in a different position of operation;

Fig. 11 is a sectional view taken along the line 11—11 of Fig. 10;

Fig. 12 is a similar view taken along the line 12—12 in Fig. 9;

Fig. 13 is a plan view of a portion of a modified form of the invention;

Fig. 14 is a sectional view thereof as taken along the line 14—14 in Fig. 13;

Fig. 15 is an elevational view of a preassembled screw blank and lock washer as produced by the mechanism of Fig. 3 or Fig. 13;

Fig. 16 is a plan view generally similar to Fig. 13 showing a further modified form of the invention;

Fig. 17 is a sectional view thereof as taken along the line 17—17 in Fig. 16;

Fig. 18 is a sectional view similar to Fig. 17 illustrating a further modified form of the invention;

Fig. 19 is an elevational view of a preassembled screw and lock washer produced with the aid of the thread roller shown in the form of the invention described with regard to Figs. 1 and 2;

Fig. 22 is a side elevational view corresponding to a part of Fig. 21;

Fig. 23 is a substantially vertical section taken along the line 23—23 in Fig. 20;

Fig. 24 is a sectional view taken substantially along the line 24—24 in Fig. 22;

Fig. 25 is a sectional view taken substantially along the line 25—25 in Fig. 22;

Fig. 26 is a side view partially in axial section showing a nut element as first telescoped with a washer; and Fig. 27 is a view similar to Fig. 26 with the nut element and washer permanently secured together.

Figure 1:
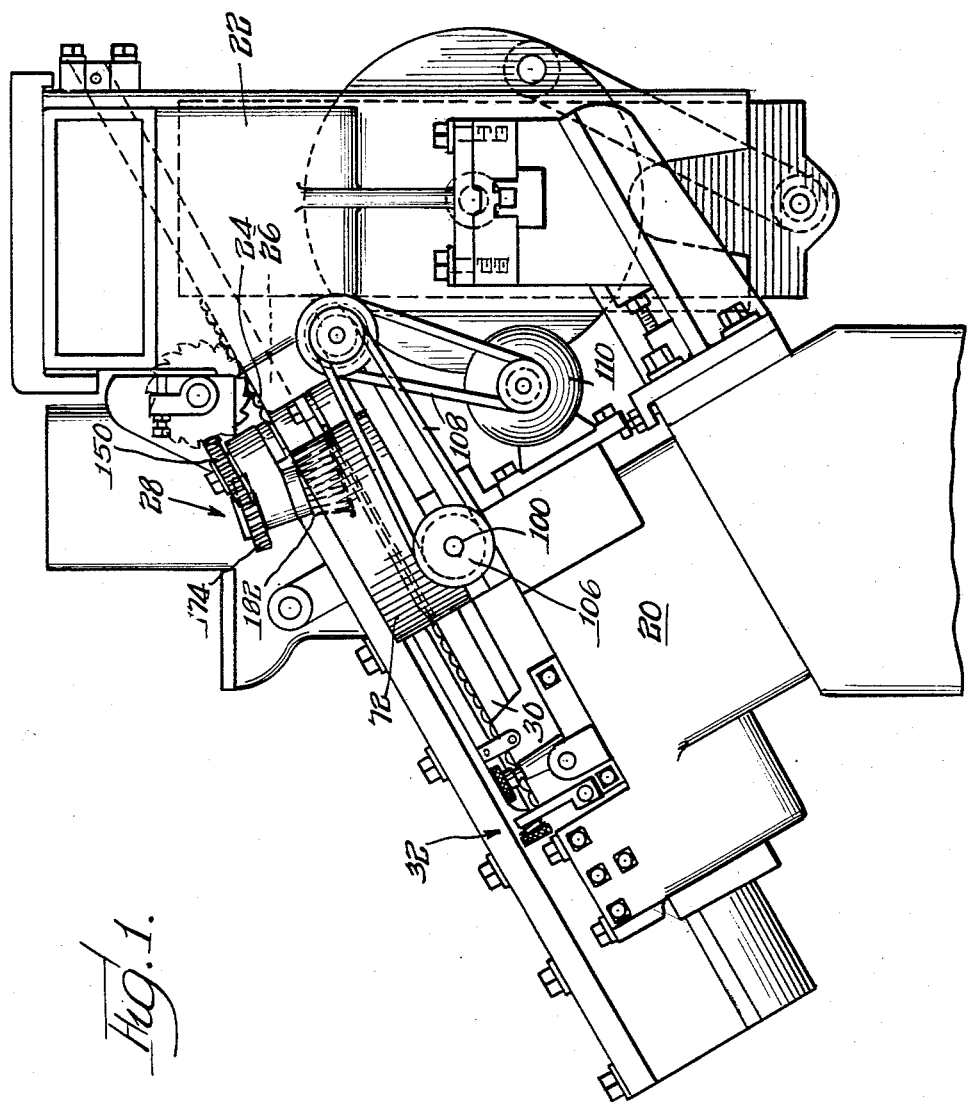
Fig. 1 is a side elevation of a machine incorporating the principles of the invention.
Figure 2:
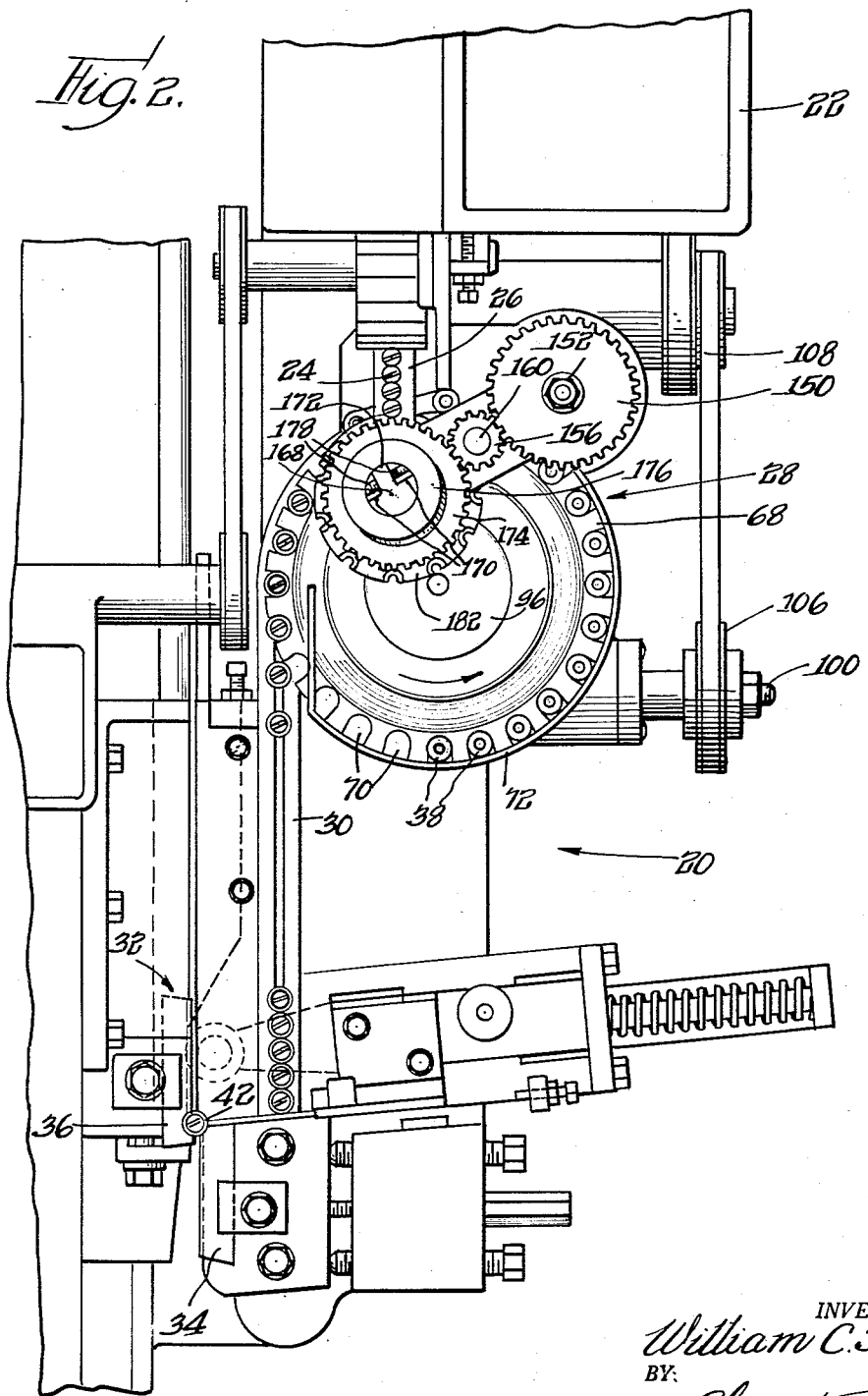
Fig. 2 is a fragmentary plan view thereof.
Figure 20:
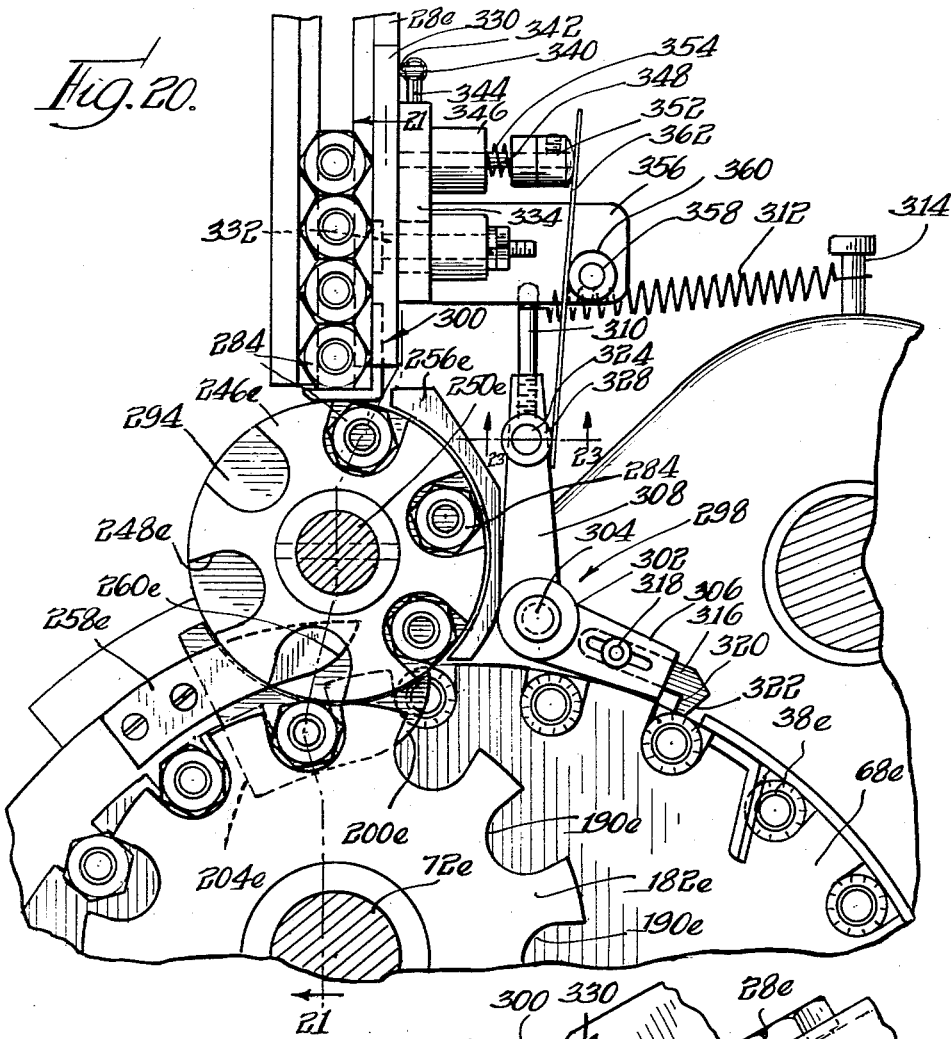
Fig. 20 is a fragmentary plan view of the apparatus as adapted for assembling nut elements and washers.
Figure 21:
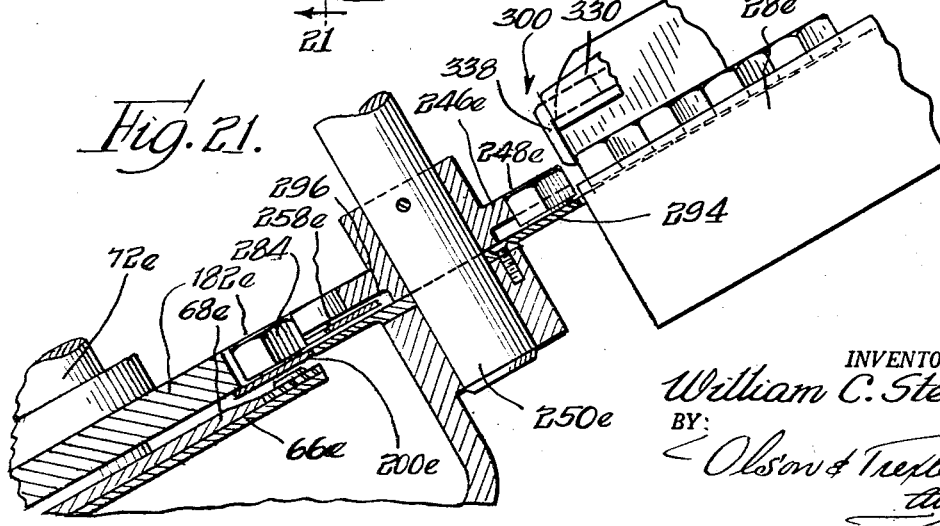
Fig. 21 is a longitudinal section as taken substantially along the line 21—21 in Fig. 20.

Referring now in greater particularity to the drawings, and first to Figs. 1 and 2, there will be seen a machine 20 constructed in accordance with the principles of this invention. This machine includes a hopper mechanism 22 for delivering screw blanks 24 in succession down a gravity chute 26. The chute is of the usual type wherein the screws are supported by the heads with the shanks thereof depending between spaced rails. The hopper mechanism is of a type well known in the art, and may be such as is disclosed, for example, in Hannenman Patent 2,321,548 issued June 8, 1943, and entitled, "Washer Feeding Means."

The screw blanks 24 in the chute 26 are delivered to an assembling mechanism 28, hereinafter to be described in greater detail, and the screw blanks pass from the assembling mechanism down an additional inclined chute or track 30 to a thread rolling mechanism 32 comprising a fixed die 34, and a reciprocable die 36. The screw blanks 24 are assembled with lock washers 38, preferably of the twisted tooth variety, by the assembling mechanism 28, and the thread rolling mechanism 32 rolls or extrudes threads 40 (Fig. 19) on the shank of the screw blanks. The extruded threads trap the lock washer 38 rotatably about the upper portion of the blank shank beneath the head of the screw to form the preassembled fastener unit 42 of the well known "Sems" type.

The thread rolling mechanism also may be of the type shown in the aforementioned Hannenman patent, and further description thereof is accordingly believed to be unnecessary. The assembled units 42 pass from the machine 20 to any suitable receptacle or conveying means as will be understood.

The assembling mechanism 28 is shown in Fig. 3 in conjunction with a shank deforming mechanism 44 other than a thread roller. The deforming mechanism 44 receives the temporary assemblies from the track 30 and swages portions thereof outwardly beneath the washer as is indicated at 46 (Figs. 5 and 15). The assemblies so produced are identified by the numeral 42a, the screw blanks being identified as 24a, and the washers as 38a. The extrusions or protuberances 46 hold the washers on the shanks of the screw blanks 24a so that the fastener units 42a can be stored temporarily, or distributed to various thread rolling machines. The protuberances or extrusions 46 are completely obliterated in a subsequent thread rolling operation.

The apparatus 44 is similar to that disclosed in my prior Patent 2,716,762, issued September 6, 1955, and entitled "Machine and Method for Assembling Washers with Rotary Fasteners" and includes a base 48 with a chute or track 50 therein forming a continuation of the chute 30. A back-up roller 52 is provided on one side of the chute or track 50 and engages the shank of the fastener 24a as may be seen in Fig. 5. A swaging roller 54 is positioned oppositely to the back-up roller 52, and is provided with a plurality of peripherally spaced notches 56 of lesser arcuate extent than the shank diameter of the fastener blanks 24a. The swaging roller 54 is driven by a motor 57 through a belt and pulley arrangement 58, a worm 60, and a worm gear 62. The notches 56 pick up the fastener shanks upon rotation of the swaging disk, and extrude the projections 46 in the manner shown in Fig. 5. It is to be understood that it is alternative whether the thread roller 32 of Figs. 1 and 2 is used, or whether the swaging mechanism 44 of Fig. 3 is used.

The assembling mechanism 28 includes (Figs. 1–7) a cup-shaped housing 64 secured to the machine 20. A ring or plate 66 is suitably secured at the upper end of the housing, and is inclined at the same angle as the chutes 24 and 30. A conveyor disk 68 is positioned immediately above the ring or plate 66 and is arranged for rotation. The plate or disk 68 is of reduced thickness at its outer periphery, and is provided with a plurality of arcuately spaced, outwardly opening peripheral recesses 70 for conveying the washers 38. An upstanding wall 72 is mounted on the cup-shaped housing 64 and extends throughout the lower portion of the housing and disk 68, being terminated at the left side (Fig. 3) by a chordal projection 74. The retaining wall or ring 72 allows a loose or random mass of lock washers 38 to be dropped on the disk and within the wall. As a result of rotation of the disk, the lock washers are picked up one-by-one in the recesses 70 and are conveyed by the disk for purposes hereinafter to be brought out.

A shaft 76 is mounted in a boss 78 in the bottom of the housing 64 and extends upwardly therefrom. A beveled gear 80 is rotatable on this shaft, having a sleeve bearing 82 interposed between the gear and shaft, and having a ball bearing 84 interposed between the gear and boss 78. A gear 86 is pinned or otherwise rotationally fixed to the beveled gear 80, and is rotatable about the shaft 76 on the bearing 82, and on additional sleeve bearing 88. The disk 68 is received in an annular recess 90 at the top of an upward projection 92 on the gear 86 and is pinned thereto as at 94. A retaining disk or plate 96 is secured to the top of the shaft 76 by means such as a screw 98, and holds the assemblage comprising the disk 68, of the gear 86, and the beveled gear 80 down against the ball bearing 84.

A shaft 100 is journalled in a boss 102 on the side of the housing 64, and is provided at its inner end with a tapered worm 104 meshing with the beveled gear 80. The tapered worm 104 and beveled gear 80 preferably are of the type disclosed and claimed in Saari Patent 2,696,125, for "Speed Reduction Gearing," issued December 7, 1954. A pulley 106 is placed on the outer end of the shaft 100 and is driven through a belt and pulley arrangement 108 from a motor 110 on the machine 20. It will be apparent that the motor 110 acts to drive the disk 68 through the connections just described A hollow support or pedestal 112 upstands from the plate 66, and is secured thereto by means such as bolts 114 passing through an arcuate, radially extending flange 116 adjacent the base of the pedestal. The reduced lower end of the pedestal as at 118 passes through a complementary aperture in the plate 66.

The pedestal is reduced in diameter in its upper portion, and is provided with a threaded section 120 on which an adjusting nut 122 is threaded. A transverse support or arm 124 is secured on the reduced section 126 of the pedestal 112, and its height on this section is determined by the position of the adjusting nut 122. The arm 124 is held on the reduced pedestal section 126 by means of a split clamp construction shown in Fig. 3. This split clamp construction includes an arcuate clamp 128 having laterally extending ears 130 cooperable with similar ears 132 on the main portion of the arm. The clamp sections are separably held together by means such as bolts 134 extending through one of the ars of each pair and threaded into the adjacent ear. Thus, the nut 122 determines the height of the arm 124, and the clamping mechanism prevents upward movement of the arm, or pivoting thereof about the pedestal 126.

A shaft 136 extends through the pedestal 112, and beyond the opposite ends thereof. The shaft is journalled in sleeve bearings 138 at the opposite ends of the pedestal, and bearing washers 140 are provided about the ends of the shaft and engaging the outer ends of the pedestal. A gear 142 is suitably keyed or otherwise affixed to the reduced lower end of the shaft 136, and is held in place by means such as a nut 144 threaded on a reduced end of the shaft and clamping a washer 146 against the gear. The gear, in turn, is held against the bearing washer 140. An idler gear 148 meshes with the gear 142, and with the gear 86 to drive the shaft 136. At the upper end of the shaft 136 there is provided a gear 150 suitably keyed or otherwise held to the shaft for rotation therewith. A nut 152 clamps a washer 154 against the gear 150 to hold the gear down against the bearing washer 140. An idler gear 156 which meshes with the gear 150 is mounted on a bearing bushing 158 about a stud 160 threaded into the upper surface of the arm 124.

The outer end of the arm 124 is provided with a bore 162 (Fig. 7) generally perpendicular to its upper and lower surfaces. A turret shaft 164 is received in this bore, and is journalled by means of bearings 166 which may comprise sleeve bearings having washers overlying the upper and lower surfaces of the arm, or which may comprise bushings having circumferential, radially extending flanges in place of the washers. The turret shaft 164 is provided with an enlarged head 168 overlying the upper surface of the arm 124. This head is generally cylindrical in configuration, but is provided with a pair of cut out sections 170 (see also Fig. 2), leaving a radially extending rib 172. A gear 174 is received about the head 168, and has a reduced hub 176 through which set screws 178 are threaded in opposition to one another so as to bear against the rib 172. Adjustment of the set screws determines the angular position of the gear 174 with regard to the turret shaft 164, and thereby provides means for adjusting the angular position of the shaft with regard to the gear, and hence of the angular position of a turret hereinafter to be set forth with regard to the disk 68. The gear 174 meshes with the idler gear 156, as will be apparent. The teeth of the gear 174 are twisted or spiralled since the gear does not lie in the same plane as the gears 150 and 156, and the gear 156 is provided with teeth of a type that will mesh with both of the gears 150 and 174.

The lower end of the turret shaft 164 is of reduced diameter as at 180. A turret 182 is secured on the reduced lower end 180 by means such as a nut 184, and the turret is keyed to the reduced lower end by means such as a key 186.

The major portion of the turret 182 is in the form of a hollow frustum of a cone depending as a skirt from a central hub portion 188 clamped by the nut 184 against the shoulder of the turret shaft 164 adjacent the reduced portion 180. This hub portion of the turret also bears against the underside of the bearing 166. The turret 182 is provided with a plurality of circumferentialy spaced recesses or flutes 190 arranged substantially as conical elements. A positioning ring 192 is secured against the underside of the previously described portion of the turret by means such as screws 194 (Fig. 6) and extends outwardly beyond the remainder of the turret. The ring 192 is provided with outwardly opening edge recesses 196 aligned with the recesses or flutes 190. The recesses 196 are of smaller diameter than the flutes 190, and are spaced outwardly therefrom radially of the turret. The recesses 196 preferably have beveled edges 198. As will be explained hereinafter, the screw blanks 24 (see Fig. 7) are received in the flutes with the screw heads fitting in a slightly loose manner in the flutes, and with the lower ends of the shanks depending through the ring recesses 196. Accordingly, the flutes or recesses 190 and the ring recesses 196 are relatively proportioned so as to support a screw blank by the head and shank tip respectively with the screw blank aligned longitudinally of the elemental flute or recess.

It will be observed that although the turret 182 is eccentric with regard to the disk 68, it is substantially coincident or tangent therewith at the area immediately adjacent and below the track or chute 26. In this area there is provided a blank supporting plate 200 (Figs. 7 and 8). This plate extends in beneath the lower edge of the turret 182, and above the disk 68 whereby slidingly to support the screw blanks 24 in a limited area. The screw supporting plate 200 is clamped to the top of the plate 66, being spaced there above by a spacer 201, along the inner edge thereof by means such as screws and clamping blocks 202, and the plate extends from somewhat above the upper edge of the chute 26 (relative to the counterclockwise direction of rotation of the disk and turret) to a point 204 where the peripheries of the disk and turret are in coincidence with the turret flutes or recesses 190 aligned with the disk recesses 70. A finger 206 of the plate 200 extends beyond this point, but radially inwardly of the turret relative of the position of the screw blanks.

The assembling apparatus further is provided with a detector finger 208, see Figs. 3 and 4 and especially Figs. 9–12. The detector 208 is in the form of an elongated finger pivoted on the plate 66 at 210, and urged toward the disk 68 by means such as a spring 212. The outer or free end of the detector finger 208 is in the form of a circular head 214 adapted to fit into the successive recesses 70 of the disk 68 as in Figs. 10 and 11. However, when a washer 38 is present in one of the recesses, the head 214 engages the washer as in Figs. 9 and 12, and does not enter the recess.

A stud 216 upstands from the head 214, and is provided at its upper end with a fastener supporting or rejecting plate or lip 218 projecting toward the turret 182. When the head 214 extends into a recess 70, as in Figs. 10 and 11, the lip 218 engages beneath the head of a fastener blank 24 to prevent the fastener blank from dropping from the turret through the disk recess. Conversely, when a washer is present, engagement of the head 214 with the washer holds the lip 218 back, and the blank is free to drop through the washer as in Fig. 12.

It will be observed that the head 214 and lip 218 are located at the precise point where one of the turret flutes or recesses 190 is in alignment with one of the disk recesses 70.

A stationary ring 220 encircles the turret 182, and is on the same elevation as the lip 218, the upper end 222 of the ring being positioned immediately adjacent the lip 218. Screw blanks 24 which are engaged by the lip 218, and which therefore do not drop, have their heads received on the ring 220, and are carried around the turret by the ring 220. The ring is terminated at 224 adjacent the plate or support 200, so that as a rejected screw blank which is carried around the turret by the ring 220 is released by the ring, it is supported by the plate 200. It will be appreciated that such a screw blank readily will pass the lower end of the chute or track 26, and will prevent another blank from passing into the occupied flute or recess 190. The blank then will be dropped through a washer in the normal course of events, or may be supported again by the lip 218 and ring 220. It will be understood that almost always each recess 70 will be occupied by a washer, and the chances of any blank being carried around the turret more than once are quite remote.

*Operation*

Operation of the machine as heretofore shown and described will be apparent from the foregoing. However, a summary of the operation is set forth at this point for convenience.

Washers 38 are dropped in a random mass on the surface of the disk 68 and within the lower portion of the confining wall 72. The disk is rotated counterclockwise by the drive connections described, and this causes the recesses 70 of the disk to pick up the washers from the random mass, one washer to a recess.

Screws in the hopper 22 are fed therefrom in the usual manner into the chute or track 26. The screws or screw blanks in this chute or track descend gravitationally to the turret 182, and pass successively into the recesses or flutes 190 in the turret. The recesses or flutes are sufficiently high as to tend to line-up the screws or screw blanks along elements of the turret, and the bevels 198 of the ring 192 complete such alignment. The screw blanks are carried slidingly on the supporting plate 200 until they tend to drop off the trailing edge 204 thereof. It will be apparent that the plate 200 passes above a periphery of the rotating disk 68 and below the ring 192 of the turret 182. Accordingly, a screw blank 24 is slidingly supported on the plate 200. When screw blank 24 reaches the end or edge 204 of the supporting plate 200 it is in perfect alignment with the washer aperture 70 below it, and it is traveling at the same speed, in substantially the same direction. If the washer detector head 214 engages the washer 200 as in Fig. 12, then the lip 218 is held in the retracted position shown in this figure, and the screw blank drops through the washer as shown in Fig. 12. Downward movement of the blank is arrested by the engagement of the underside of the blank head with the top of the washer 38.

On the other hand, if the head 208 passes into the washer recess 70 due to the absence of a washer therefrom, as in Fig. 11, then the lip 218 is moved in beneath the head of the screw blank shank 24, and prevents the blank from dropping. In this condition, it will be appreciated that the head 214 is positioned adjacent the trailing edge 204 of the plate 200, and moves in generally towards the extending finger 206. A screw blank which is so arrested passes on to the ring 220 and is carried around the turret for another opportunity for telescoping with a washer.

The disk 68 removes the screw blanks substantially tangentially.

The underlying plate 66 is provided with a screw blank shank receiving slot or aperture 226 (see Fig. 10) into which the shanks depend, and this slot extends tangentially from the left side of the disk as viewed in the drawings, and extends into the track or chute 30, whereby the telescoped screw blanks and washers are carried away from the disk and down the chute or track 30. The telescoped screw blanks and washers then are passed to the thread rolling mechanism 32 in accordance with one form of the invention, or are passed to the shank deforming or swaging mechanism 44 in accordance with another form of the invention. The completed assemblies 42 (Fig. 19) or the permanently telescoped partial assemblies 42a (Fig. 15) pass from the machine and are collected in any suitable receptacle or conveying mechanism, as will be understood.

*Modifications*

A modified form of the invention is shown in Figs. 13 and 14. Most of the parts as shown in these figures are similar to those heretofore shown and described, and accordingly similar numerals are utilized with the addition of the suffix $b$ to identify similar parts. The major distinction is that washers are not picked up by the disk 68b, but rather are picked up in a separate hopper 228 including a disk 230 rotated through suitable drive means in timed relation with the disk 68b. A supporting ring or plate 232 is associated with the disk 230, and is surrounded by an upstanding cylindrical wall 234. The disk 230 is provided with circumferentially spaced, outwardly opening edge recesses 236. Washers 38b are dropped on the disk 230 in a random mass, and they are picked up by the recesses 236 upon counterclockwise rotation of the disk.

A transfer disk 238 is located in the same plane as the disk 230, which incidentally is co-planar with the disk 68b, and rotates in a clockwise manner in timed relation to, and in synchronism with the disks 230 and 68b. The disk 238 is of smaller diameter, and is provided with circumferentially spaced, outwardly opening edge recesses 240 which receive the washers 38b from the recesses 236 of the disk 230. It will be appreciated that all of the disks are inclined, and gravity aids the transfer from the disk 230 to the disk 240. The washers then are carried along a slide plate or ring 242 forming a continuation of the plate 232, and are held in the recesses by an arcuate wall or flange 244.

On completing substantially one half of a revolution of the disk 238 each washer 38b drops from one of the recesses 240 therein into one of the recesses 70b of the disk 68b. The washers then are conveyed toward the assembly point the same as in the previous embodiment.

Greater efficiency in picking up washers, particularly those of certain sizes and shapes, is attained by the use of the separate hopper 228.

In the previous embodiment of the invention, the turret 182 was of frusto-conical shape so that the bottom of the turret could provide substantial clearance above the disk 68, while still supporting the screw blanks perpendicular to this disk as they are carried from the track or chute 26 and dropped through the washers. In the present embodiment of the invention the washers are not dropped in a mass on top of the disk 68b, and hence there is no necessity for providing a substantial clearance above the top of the disk 68b. Accordingly, the turret 182b, as most readily will be seen in Fig. 14, is of cylindrical, rather than of frusto-conical shape. The axis of the turret in this instance is perpendicular to the disk 68b.

Picking up and transfer of the washers to the disk 68b previously has been described. Carrying of the screw blanks 24b from the the chute 26b and dropping thereof into the washers, with subsequent removal of the assemblies 42b from the turret and disk is substantially the same as that described with regard to the previous embodiment of the invention. Repetition of this operation is believed to be unnecessary.

In the embodiment of the invention illustrated in Figs. 16 and 17, most of the parts are similar to those heretofore shown and described, and are identified by similar numerals with the addition of the suffix $c$. The disk 68c may receive a random mass of washers on the face thereof, as in Fig. 3 for example, or it may have the washers transferred to it from a separate hopper as in Fig. 13. The essential difference with regard to Figs. 16 and 17 is that the screw blanks 24c are supplied to the turret 182c through the intermediary of a transfer disk 246. This transfer disk is mounted with its top surface co-planar with the top of the track or chute 26c, and is provided with arcuately spaced peripheral recesses 248. The transfer disk 246 is mounted on a shaft 250 which is driven by a gear 252 which may mesh with the idler gear 148c. A sleeve 254 is mounted in the plate 66c, or otherwise, and rotatably supports the shaft 250.

An arcuate guide 256 is provided on the right side of the transfer disk 246, and holds screw blanks 24c picked up from the track 26c in the recesses 248. The transfer disk 248 is driven in synchronism, and in proper phase relation with the turret 182c so that the recesses 248 are opposite the turret recesses or flutes 190c whereby the blanks are transferred gravitationally and also by the aid of a guide 258 having a tapered tip 260, into the flutes 190c.

The embodiment of Fig. 18 is of importance with particular types of screws, and with operation at particular speeds in that positive means is provided for assembling the screw blanks with the washers. Most of the parts are similar to those previously described, and are identified by similar numerals with the addition of the suffix $d$. The difference is that the flutes or recesses 190d of the turret are provided with pushers or slide blocks 262 which are reciprocal in the flutes. An encircling band or ring 264 provides a guide restraining the slide blocks against outward movement, and connecting rods 266 are adjustably threaded into the slide blocks 262. The connecting rods are provided with flat heads 268.

A shouldered ring or retainer 270 surrounds the upstanding boss 188d of the turret 182d, and the connecting rods 266 pass through suitable apertures therein. Springs 272 encircling the connecting rods are compressed between the slide blocks or pushers 262 and the undersides of the shoulders 274, whereby the slide blocks or pushers are resiliently urged downwardly.

The arm 124d is provided with a depending cylindrical boss 276 around which is provided a ring 278 having a circumferential cam ramp 280 on which the heads 268 of the connecting rods 266 ride. The ring is held to the underside of the arm by means such as screws or bolts 282. The cam is provided with a high spot opposite to the track or chute 26d to allow the heads of the screw blanks 24d to pass beneath the retracted slide block or pusher 262. The cam ramp then lowers rather rapidly so that the springs 272 of succeeding slides or cams 262 will push the screw blanks rapidly down through the washers 38d. The cam ramp remains relatively low until reaching the right side as shown in Fig. 19, and then rises to the high spot opposite the chute or track 26d.

It will be apparent that operation is similar to that previously described, except that the screw blanks are positively pushed downwardly through the washers by the force of the springs 272. This is advantageous with certain types of screws, and permits higher speeds of operation.

In all of the forms of the invention, it will be apparent that the turret readily aligns the screw blanks with the washers carried by the washer disk, and insures movement of the screw blanks at the same speed as the washers so that the screw blanks readily will telescope with the washers. Generally the screw blank turret is eccentric relative to the washer disk, and it is important to note that regardless of the relative sizes of the washer disk and the screw blank turret the turret and disk are coincident or tangent at the point where the screw blanks are dropped into the washers in the disk. Furthermore, the peripheral speeds of the turret and disk are equal.

The principles of this invention are applicable also to the assembling of nuts or nut elements with washers as is set forth hereinafter with regard to Figs. 20–27. Many parts of the apparatus are the same as, or are similar to, parts previously described. Accordingly, such parts are identified by the use of similar numerals with the addition of a suffix *e*. Before referring to the apparatus, it is thought that reference to Figs. 26 and 27 for the showing of the nut elements and washers will be found helpful. Thus, the nut elements as originally supplied (Fig. 26) and hereinafter identified by the numeral 284, are provided with circular recesses 286 in their clamping faces. The outer surfaces 288 of these recesses are frusto-conical in nature. Each nut element has an axially extending skirt 290 defining the inner margin of the recess 286, and this skirt or flange may terminate equal with the plane of the clamping face of the nut, or may extend somewhat beyond this clamping surface. The nut bore preferably is threaded, as illustrated.

The lock washer 38*e* is of the twisted tooth type similar to that previously described, but additionally has a frusto-conical flange 292 along its inner margin, such flange being received in the recess 286 of the nut element 284. Subsequent to telescopic assembling of the nut element and washer, as is shown in Fig. 26, the nut flange or skirt 290 is swaged outwardly within and partially beneath the washer skirt or flange 292 as is shown in Fig. 27. The nut and washer thereby are permanently assembled. Preferably, the nut flange or skirt is not swaged outwardly sufficiently to clamp the washer in place, but merely traps the washer so that the washer is free for rotation relative to the nut element. Suitable apparatus or mechanisms for swaging the nut element skirt or flange are well-known in the art, see Nielsen Patent 2,711,550, issued June 28, 1955, for example.

The washer disk structure and associated parts remain substantially the same as heretofore described, the washer disk being identified by the numeral 68*e*. The washers may be picked up from a random mass on the surface of the disk, or may be fed to the surface of the disk from a separate hopper, in accordance with the principles heretofore set forth. The nut turret 182*e* is generally similar to the turrets heretofore described, but is of lesser height due to the relatively small axial dimension of one of the nut elements 284. A slide plate 200*e* underlies a part of the periphery of the nut turret 182*e* whereby to support nuts therein, the plate 200*e* being terminated at 204*e* at the position where the turret is substantially tangent or coincident with the periphery of the washer disk 68*e*. The nut elements accordingly drop from the plate 200*e* on to the washers 38*e* carried in the recesses of the washer disk. The nut elements and washers at this time appear as in Fig. 26, and the disk 68*e* removes the nut elements tangentially from the turret 182*e*. The nut elements and washers then pass gravitationally from the disk 68*e* through any suitable guide means (not shown) to a swaging or staking mechanism (not shown) for swaging or expanding the nut element skirt to produce the finished item as shown in Fig. 27.

Nut elements 284 are transferred from the nut chute or slide 28*e* to the turret 182*e* by a transfer disk 246*e*, having a slide plate 294 thereunder for slidingly supporting the nut elements carried in the recesses 248*e*. An arcuate guide 256*e* holds the nut elements in the recesses of the nut element transfer disk 246*e* until such time as they approach the flutes or recesses 190*e* of the turret 182*e*. A guide 258*e* having a curved tip 260*e* projects into an undercut 296 in the underside of the transfer disk 246*e* positively to urge the nut elements 284 from the transfer disk into the flutes or recesses 190*e* of the turret 182*e*. The foregoing structure is substantially similar to that heretofore shown and described, but modified somewhat for operation with nut elements.

In addition to the foregoing, certain additional novel parts are added which, although shown specifically with regard to the assembling of nut elements with washers, are equally applicable to the assembling of screw blanks with washers. More particularly, the additional parts or mechanism comprises a washer detector 298 and a nut element release mechanism 300. The washer detector comprises a bell crank 302 pivoted at 304 on a fixed part of the machine, and having a short arm 306 extending substantially tangentially of the disk 68*e*, and a long arm 308 extending outwardly away from the washer disk 68*e*. A stud 310 is threaded into the end of the extending arm 308, and extends longitudinally outwardly therefrom, and a coil spring 312 is tensioned between this spring and a stud or anchor 314 on a fixed part of the machine for resiliently biasing the arm 306 towards the disk. A detector finger 316 is telescopically received in the arm 306, being adjustably locked in place by a screw-in-slot connection 318. The finger has a tip 320 extending radially in toward the disk 68*e*, said tip having a cam edge 322. As will be evident, the finger tip 320 engages washers 38*e* as in Fig. 20, whenever washers are in the recess of the disk. In the event that there is no washer in the recess, the spring 312 will pivot the bell crank 302 in a clockwise direction, the finger tip 320 extending into the recess of the disk. The edge of the recess will engage the cam surface 322 to remove the finger tip from the recess as the disk 68*e* continues to rotate.

The arm 308 is provided adjacent its end with an upstanding stud 324 surrounded by a bushing 326 and having a sleeve or roller 328 thereon. This stud serves to transfer motion from the washer detecting mechanism 298 to the nut release mechanism 300, as will be set forth hereinafter.

The nut element release element 300 includes an arm 330 pivoted at a mid-position on a stud 332 on a wall 334 secured against the side of the nut element feed chute or track 28*e*. A boss 336 on the side of the wall 334 provides a firm bearing for the stud 332. The forward or lower end of the arm 330 is provided with an angular or hook-like nut retainer member 338 capable of being positioned in front of (below) a line of nuts or nut elements 284 in the feed chute or track 28*e*.

A spring 340 is stretched between a pin 342 on the tail of the arm 330 and an anchor stud 344 extending from the end of the wall 334. The spring normally pulls the nut element retainer 338 out of the path of the nut elements in the feed chute or track.

A bushing 346 is secured in the wall 334 between the pivot stud 332 and the pin 342. An actuating pin or rod 348 is slidably mounted in the bushing 346 and has a tapered, cam tip 350 projectable below the arm 330 to urge the tail thereof upwardly. A button 352 is secured on the outer end of the actuating pin or rod 348, and a compression spring 354 between the button and the bushing 346 normally holds the actuating pin or rod 348 in the retracted position shown in Fig. 24.

An angle bracket 356 (Figs. 20, 22, and 25) extends laterally from the wall 334, and is provided adjacent its outer end with an upstanding pin 358. A roller 360 is rotatably mounted on this pin above the bracket 356, and substantially on the same level as the pin 348, relative to the inclination of the machine.

A spring blade 362 (Figs. 20 and 22–25) is trapped against the roller 328 and the button 352 by the roller 360. The blade is normally tensioned sufficiently to hold it in place, but is not tensioned enough to overcome the force of the springs 354 and 340. However, when no washer is engaged by the finger tip 320 of the washer detector, the washer detector pivots in a clockwise direction as previously indicated, and this causes counterclockwise rotation of the spring blade 362. This causes the actuating rod or pin 348 to be depressed against the force of the spring 354, whereby the cam tip 350 of this raises the tail of the arm 330, whereby the retainer 338 is positioned in front of the row of nut elements to prevent a nut element from being received by one of the recesses 48e of the transfer disk 246e. It will be appreciated that the retainer is positioned the same number of nut element spaces away from the tangent or coincident position of the turret and disk (i.e., the end 204e of the plate 200e) as the finger tip 320 is positioned ahead of this drop off point. It will be appreciated that the spring blade 262 prevents any damage to the parts should there be a jam or some other factor preventing pivoting of the arm 330.

It is to be understood that the various embodiments of the invention as shown and described herein are for purposes of illustration. Various changes in structure will no doubt occur to those skilled in the art, and are to be understood as forming a part of this invention insofar as they fall within the spirit and scope of the appended claims.

The invention is claimed as follows:

1. Apparatus for assembling fasteners with washers comprising a disk carrier of predetermined diameter having means thereon for carrying washers in predetermined spaced relation, a turret of predetermined smaller diameter overlying said disk and having means thereon for carrying fasteners in predetermined spaced relation, said disk and said turret being eccentric and the peripheries thereof being in part substantially coincident, means for rotating said disk and said turret in timed relation in the same direction with the fastener carrying means of the turret aligned with the washer carrying means of the disk at the coincident part and moving at substantially the same linear rate, and means for effecting axial telescoping movement of said fasteners into said washers at said coincident part.

2. Apparatus for assembling fasteners with washers comprising a disk carrier of predetermined diameter having means thereon for carrying washers, a turret of smaller diameter overlying said disk and eccentric relative thereto, said turret having means thereon for carrying fasteners, the peripheries of said disk and said turret being in part substantially coincident, means for rotating said disk and said turret in timed relation in the same direction with the fasteners and washers aligned with one another at the coincident part of the peripheries and moving at substantially the same linear rate, and means for effecting axial telescoping movement of said fasteners into said washers at said coincident part.

3. Apparatus for assembling fasteners with washers comprising a disk carrier of predetermined diameter having means thereon for carrying washers, a turret of smaller diameter overlying and spaced above said disk and having means thereon for carrying fasteners, said disk and said turret being eccentric and the peripheries thereof being in part substantially coincident, a fastener supporting member positioned beneath said turret and above said disk for sliding support of fasteners carried by said turret, said member being interrupted at the coincident part of said peripheries, and means for rotating said disk and said turret in timed relation in the same direction with the fastener carrying means of the turret aligned with the washer carrying means of the disk at the coincident part and moving at substantially the same linear rate, said fasteners dropping gravitationally from said member at the interruption thereof and telescoping with said washers.

4. Apparatus for assembling elongated fasteners with washers comprising a disk carrier of predetermined diameter having recesses therein for carrying washers in predetermined spaced relation, a turret of lesser diameter and eccentric relative to said disk overlying said disk and having peripherally spaced flutes thereon for carrying elongated fasteners in predetermined spaced relation, the axial dimension of said turret being much greater than of said disk, the peripheries of said disk and said turret being in part substantially coincident, means for rotating said disk and said turret in timed relation in the same direction with the flutes of the turret aligned with the recesses of the disk at the coincident part of the peripheries and moving at substantially the same linear rate, and means for effecting axial telescoping movement of said fasteners into said washers at said coincident part.

5. Apparatus as set forth in claim 4 wherein the turret is cylindrical and wherein the axes of the turret and of the disk are parallel.

6. Apparatus as set forth in claim 4 wherein the turret is substantially frusto-conical, and the axes of the turret and of the disk are non-parallel whereby the axes of the flutes at the coincident part of the peripheries are substantially parallel to the axis of the disk.

7. Apparatus for assembling headed fasteners having elongated shanks with washers comprising a disk carrier having recesses therein for carrying washers, a turret of smaller diameter than said disk overlying said disk generally within the circumference thereof and having an axial dimension greater than the length of said fasteners and having peripherally spaced flutes thereon for receiving said fasteners, said flutes having a diameter such as to receive the heads of the fasteners, means at the bottoms of said flutes providing recesses of reduced diameter to receive the shanks of said fasteners whereby the fasteners are substantially aligned with the axes of said flutes, the peripheries of said disk and said turret being in part substantially coincident, means for rotating said disk and said turret in timed relationship in the same direction with the flutes of the turret aligned with the recesses of the disk at the coincident part and moving at substantially the same linear rate, and means for effecting axial telescoping movement of said fasteners into said washers at said coincident part.

8. Apparatus for assembling headed fasteners with washers comprising a disk carrier having outwardly opening edge recesses therein for carrying washers, a turret of smaller diameter than said disk overlying said disk within the peripheral confines thereof and having peripherally disposed flutes thereon for carrying headed fasteners, the peripheries of said disk and said turret being in part substantially coincident, means for rotating said disk and said turret in timed relationship in the same direction with the flutes aligned with the recesses at the coincident part and moving at substantially the same linear rate, means for effecting axial telescoping movement of said fasteners into said washers at said coincident part, and a detector device for preventing said telescoping in the event that a washer is absent from a recess, said detector device comprising a member tending to project laterally into the disk recesses, such projection being resisted by washers when washers are in such recesses, and a lip spaced above said member and engaging beneath the heads of said fasteners when said member projects into a recess having no washer.

9. Apparatus for assembling fasteners with washers comprising a disk carrier having means thereon for carrying washers, a turret of smaller diameter than said disk overlying said disk substantially within the circumference thereof and having means thereon for carrying fasteners in predetermined position, the peripheries of said disk and said turret being in part substantially coincident, means for rotating said disk and said turret in timed relation in the same direction with the fastener carrying means of the turret aligned with the washer carrying means of the disk at the coincident part and moving at substantially the same linear rate, means for effecting axial telescoping movement of said fasteners into said washers at said coincident part, and means for deforming one of each telescoped washer and fastener for retaining the washers and fasteners in telescoped relation.

10. Apparatus for assembling fasteners with washers comprising a disk carrier having a plurality of recesses therein, said disk being inclined, a wall positioned adjacent the lowermost part of said disk whereby a random mass of washers may be deposited on said disk for picking up and carrying of said washers in said recesses, a turret of smaller diameter than said disk overlying said disk within the peripheral confines thereof and having means thereon for carrying fasteners in predetermined position, the peripheries of said disk and said turret being in part substantially coincident, means for rotating said disk and said turret in timed relation in the same direction with the fastener carrying means of the turret aligned with the washer carrying means of the disk at the coincident part and moving at substantially the same linear rate, and means for effecting axial telescoping movement of said fasteners into said washers at said coincident part.

11. Apparatus for assembling fasteners with washers comprising a disk carrier having means thereon for carrying washers, a washer hopper, a rotary carrier positioned between said washer hopper and said disk carrier for transferring washers from said hopper to the carrying means of said disk carrier, means for rotating said disk carrier and said rotary transfer means in timed relation for effecting such transfer, a turret of smaller diameter than said disk overlying said disk within the peripheral confines thereof and having means thereon for carrying fasteners, the peripheries of said disk and said turret being in part substantially coincident, means for rotating said disk and said turret in timed relation in the same direction with the fastener carrying means of the turret aligned with the washer carrying means of the disk at the coincident part and moving at substantially the same linear rate, and means for effecting axial telescoping movement of said fasteners into said washers at said coincident part.

12. Apparatus for assembling fasteners with washers comprising a disk carirer of predetermined diameter having means thereon for carrying washers in predetermined position, a turret of smaller diameter overlying said disk eccentric thereto and having means thereon for carrying fasteners in predetermined spaced relation, a fastener supply chute terminating adjacent said turret and supplying fasteners to the carrying means of said turret directly from said chute, the peripheries of said disk and said turret being in part substantially coincident, means for rotating said disk and said turret in timed relation in the same direction with the fastener carrying means of the turret aligned with the washer carrying means of the disk at the coincident part and moving at substantially the same linear rate, and means for effecting axial telescoping movement of said fasteners into said washers at said coincident part.

13. Apparatus for assembling fasteners with washers comprising a disk carrier having means thereon for carrying washers, a turret of smaller diameter than said disk overlying said disk within the peripheral confines thereof and having means thereon for carrying fasteners, a feed chute supplying fasteners, a rotary carrier positioned between said feed chute and said turret for transferring fasteners from said feed chute to said turret, means for rotating said transfer means and said turret in timed relation to effect such transfer, the peripheries of said disk and said turret being in part substantially coincident, means for rotating said disk and said turret in timed relation in the same direction with the fastener carrying means of the turret aligned with the washer carrying means of the disk at the coincident part and moving at substantially the same linear rate, and means for effecting axial telescoping movement of said fasteners into said washers at said coincident part.

14. Apparatus for assembling fasteners with washers comprising a disk carrier having means thereon for carrying washers along a predetermined path, a turret of smaller diameter than said disk overlying said disk within the peripheral confines thereof and having means thereon for carrying fasteners over a predetermined path, said paths in part being substantially coincident, means for rotating said disk and said turret in timed relation in the same direction with the fastener carrying means of the turret aligned with the washer carrying means of the disk at the coincident path part and moving at substantially the same linear rate, and means for positively shifting the fasteners axially into said washers at said coincident part.

15. Apparatus as set forth in claim 14 wherein the means for positvely shifting the fasteners axially comprises a plurality of plungers carried by said turret and operable in timed relation to the rotation of said turret.

16. Apparatus as set forth in claim 15 wherein the plungers are spring urged toward the fasteners and the disk, and further including a cam for opposing the force of said springs to control the movement of said plungers.

17. Apparatus for assembling fasteners with washers comprising a disk carrier having means thereon for carrying washers along a predetermined path, a turret overlying said disk and having means thereon for carrying fasteners along a predetermined path, said paths being in part substantially coincident, the disk and turret being relatively eccentric, said turret being of smaller diameter than said disk and lying entirely within the confines of the periphery of said disk, means for rotating said disk and said turret in timed relation in the same direction with the fastener carrying means aligned with the washer carrying means of the disk at the coincident part of the paths and moving at substantially the same linear rate, and means for effecting axial telescoping movement of said fasteners into said washers at said coincident part.

18. Apparatus for assembling fasteners with washers comprising a frame, a disk carrier carried by said frame for rotation relative thereto and having outwardly opening edge recesses for receiving and carrying washers in predetermined spaced relation, an arm supported by said frame and overlying said disk in spaced relation relative thereto, a turret of smaller diameter than said disk depending from said arm and mounted for rotation relative thereto, said turret being eccentric relative to said disk, said turret having outwardly opening edge recesses therein for receiving and carrying fasteners in predetermined spaced relation, the peripheries of said disk and said turret being in part substantially coincident, said turret being spaced above said disk, a fastener support interposed between said turret and said disk for slidingly supporting fasteners in the recesses of said turret, said support being terminated at said coincident part, means carried by said frame for rotating said disk and said turret in timed relation in the same direction with the fastener carrying means of the turret aligned with the washer carrying means of the disk at the coincident part and moving at substantially the same linear rate, said fasteners dropping telescopically into said washers as said fasteners leave said support at the termination thereof.

19. Apparatus for assembling fasteners with washers comprising a disk carrier having means thereon for carrying washers, a turret of smaller diameter than said disk overlying said disk within the peripheral confines thereof and having means thereon for carrying fasteners, a feed chute supplying fasteners, a rotary carrier positioned between said feed chute and said turret for transferring fasteners from said feed chute to said turret, means for rotating said transfer means and said turret in timed relation to effect such transfer, the peripheries of said disk and said turret being in part substantially coincident, means for rotating said disk and said turret in timed relation in the same direction with the fastener carrying means of the turret aligned with the washer carrying means of the disk at the coincident part and moving at substantially the same linear rate, means for effecting axial telescoping movement of said fasteners into said washers at said coincident part, washer detecting means detecting the presence or absence of washers in said disk a predetermined distance before said coincident parts, a fastener retainer selectively operable to prevent feeding of fasteners from said chute into said carrier at the same predetermined distance before said coincident part, and means operatively interconnecting said washer detector and said fastener retainer for allowing passing of nut elements when washers are detected, and preventing movement of fasteners from said chute into said carrier when no washer is detected.

20. Apparatus for assembling fasteners with washers comprising a disk carrier having a plurality of recesses therein, said disk being inclined from a horizontal position, a wall positioned adjacent a lowermost part of said disk whereby a random mass of washers may be deposited on said disk for picking up and carrying of said washers in said recesses, a turret overlying said disk and having means thereon for carrying fasteners in predetermined position, the axis of the turret being skewed relative to the axis of the disk, the turret being of frustoconical configuration, the peripheries of said disk and said turret being in part substantially coincident and closely spaced relative to one another, the underside of said turret otherwise being spaced increasingly further from the top surface of said disk whereby to provide clearance for washers on said disk, means for rotating said disk and said turret in timed relation in the same direction with the fastener carrying means of the turret aligned with the washer carrying means of the disk at the coincident part and moving at substantially the same linear rate, and means for effecting axial telescoping movement of said fasteners into said washers at said coincident part.

References Cited in the file of this patent
UNITED STATES PATENTS

| | | |
|---|---|---|
| 1,118,425 | Johnson | Nov. 24, 1914 |
| 1,272,634 | De Escobales | July 16, 1918 |
| 2,183,600 | Werner | Dec. 19, 1939 |
| 2,273,783 | Irwin | Feb. 17, 1942 |
| 2,284,690 | Stern | June 2, 1942 |
| 2,577,020 | Large | Dec. 4, 1951 |
| 2,792,578 | Autio | May 21, 1957 |